US011380899B2

(12) United States Patent
Koo et al.

(10) Patent No.: US 11,380,899 B2
(45) Date of Patent: Jul. 5, 2022

(54) POSITIVE ELECTRODE, SECONDARY BATTERY INCLUDING THE SAME, AND METHOD FOR MANUFACTURING USING DRY MIXING AT HIGH SHEAR FORCE

(71) Applicant: LG CHEM, LTD., Seoul (KR)

(72) Inventors: Chang Wan Koo, Daejeon (KR); Sang Hoon Choy, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 16/347,677

(22) PCT Filed: Apr. 27, 2018

(86) PCT No.: PCT/KR2018/004972
§ 371 (c)(1),
(2) Date: May 6, 2019

(87) PCT Pub. No.: WO2018/199702
PCT Pub. Date: Nov. 1, 2018

(65) Prior Publication Data
US 2020/0044257 A1 Feb. 6, 2020

(30) Foreign Application Priority Data

Apr. 28, 2017 (KR) .................. 10-2017-0055638
Apr. 27, 2018 (KR) .................. 10-2018-0049220

(51) Int. Cl.
| | | |
|---|---|---|
| *H01M 4/66* | (2006.01) | |
| *H01M 4/04* | (2006.01) | |
| *H01M 4/62* | (2006.01) | |
| *H01M 10/0525* | (2010.01) | |
| *H01M 4/02* | (2006.01) | |

(52) U.S. Cl.
CPC ......... *H01M 4/663* (2013.01); *H01M 4/0435* (2013.01); *H01M 4/623* (2013.01); *H01M 10/0525* (2013.01); *H01M 2004/027* (2013.01); *H01M 2004/028* (2013.01)

(58) Field of Classification Search
CPC .... H01M 4/663; H01M 4/0435; H01M 4/623; H01M 10/0525; H01M 2004/027; H01M 2004/028; H01M 4/0404; H01M 2004/021; H01M 4/625; H01M 10/052; H01M 4/13; H01M 4/139; H01M 4/622; H01M 4/04; H01M 50/20; H01M 2220/20; H01M 2220/30; Y02E 60/10
See application file for complete search history.

(56) References Cited

U.S. PATENT DOCUMENTS

| | | | |
|---|---|---|---|
| 10,062,900 B2 | 8/2018 | Bruckner et al. | |
| 2005/0250011 A1 | 11/2005 | Mitchell et al. | |
| 2005/0266298 A1 | 12/2005 | Mitchell et al. | |
| 2007/0122698 A1* | 5/2007 | Mitchell .............. | H01M 4/625 429/217 |
| 2007/0190424 A1 | 8/2007 | Mitchell et al. | |
| 2007/0202410 A1 | 8/2007 | Takeuchi et al. | |
| 2009/0181309 A1 | 7/2009 | Kwon et al. | |
| 2013/0288111 A1 | 10/2013 | An et al. | |
| 2014/0030590 A1* | 1/2014 | Wang .................... | H01M 4/587 429/211 |
| 2014/0315087 A1* | 10/2014 | Yu ........................ | H01M 4/625 429/221 |
| 2015/0061176 A1* | 3/2015 | Bruckner .............. | H01M 4/623 264/105 |
| 2015/0333317 A1 | 11/2015 | Lee et al. | |
| 2018/0269485 A1 | 9/2018 | Yoo et al. | |

FOREIGN PATENT DOCUMENTS

| | | |
|---|---|---|
| CN | 101369650 A | 2/2009 |
| CN | 102589719 A | 7/2012 |
| CN | 104170125 A | 11/2014 |
| CN | 104681790 A | 6/2015 |
| CN | 113054155 A | 6/2021 |
| JP | 2015-220225 A | 12/2015 |
| KR | 10-2007-0042551 A | 4/2007 |
| KR | 10-2008-0005584 A | 1/2008 |
| KR | 10-2009-0078656 A | 7/2009 |
| KR | 10-2014-012686 A | 10/2014 |
| KR | 10-2014-0136952 A | 12/2014 |
| KR | 10-2015-0061874 A | 6/2015 |
| WO | WO 2017/052064 A1 | 3/2017 |

OTHER PUBLICATIONS

International Search Report (PCT/ISA/210) issued in PCT/KR2018/004972, dated Aug. 9, 2018.
Ludwig et al., "Solvent-Free Manufacturing of Electrodes for Lithium-ion Batteries," Scientific Reports, vol. 6, No. 23150, Mar. 17, 2016, pp. 1-10.
Extended European Search Report for European Application No. 18791400.7, dated Mar. 24, 2020.

* cited by examiner

*Primary Examiner* — Kwang Han
(74) *Attorney, Agent, or Firm* — Birch, Stewart, Kolasch & Birch, LLP

(57) ABSTRACT

The present invention relates to a method for preparing a positive electrode, comprising preparing a mixture by dry mixing a positive electrode active material, a dry conductive material, and a dry binder, applying high shear force to the mixture, disposing the mixture on a current collector, and rolling the current collector on which the mixture is disposed, wherein the dry conductive material is at least any one of a carbon nanotube and a carbon fiber, and the high 10 shear force is 100 N to 500 N.

15 Claims, No Drawings

POSITIVE ELECTRODE, SECONDARY BATTERY INCLUDING THE SAME, AND METHOD FOR MANUFACTURING USING DRY MIXING AT HIGH SHEAR FORCE

CROSS-REFERENCE TO RELATED APPLICATIONS

This application claims the benefit of Korean Patent Application Nos. 10-2017-0055638, filed on Apr. 28, 2017, and 10-2018-0049220, filed on Apr. 27, 2018, in the Korean Intellectual Property Office, the disclosure of which is incorporated herein in its entirety by reference.

TECHNICAL FIELD

The present invention relates to a positive electrode, a secondary battery including the same, and a method for manufacturing the positive electrode. Specifically, the method for manufacturing a positive electrode includes preparing a mixture by dry mixing a positive electrode active material, a dry conductive material, and a dry binder; applying high shear force to the mixture; disposing the mixture on a current collector; and rolling the current collector on which the mixture is disposed, wherein the dry conductive material is at least one of a carbon nanotube and a carbon fiber, and the high shear force may be 50 N to 1000 N.

BACKGROUND ART

Demands for the use of alternative energy or clean energy are increasing due to the rapid increase in the use of fossil fuel, and as a part of this trend, the most actively studied field is a field of electricity generation and electricity storage using an electrochemical reaction.

Currently, a typical example of an electrochemical device using such electrochemical energy is a secondary battery and the usage areas thereof are increasing more and more. In recent years, as technology development of and demand for portable devices such as portable computers, mobile phones, and cameras have increased, demands for secondary batteries as an energy source have been significantly increased. Among such secondary batteries, lithium secondary batteries having high energy density, that is lithium secondary batteries having a high capacity, have been subjected to considerable research and also have been commercialized and widely used.

In general, a secondary battery is composed of a positive electrode, a negative electrode, an electrolyte, and a separator. Among these, the positive electrode may include a positive electrode active material and a conductive material. The conductive material may serve to reduce resistance by increasing electric conductivity of the positive electrode.

Meanwhile, in a charging/discharging process of a secondary battery, the positive electrode repeatedly expands and contracts, and as a cycle continues, the structure of the positive electrode collapses. Therefore, attempts to reduce a change in volume of the positive electrode using various methods have been made. Japanese Patent Laid-Open Publication No. 2015-220225 discloses reducing a change in volume of a positive electrode through a combination of a positive electrode active material and a conductive material using a carbon nanotube as the conductive material.

However, such typical attempts have been all applied to a positive electrode manufactured through a positive electrode slurry, the positive electrode slurry prepared using a solvent.

Thus, when a viscosity suitable for a manufacturing process of a positive electrode is considered, there are problems in that there are the upper limit on the content of a conductive material to be introduced to a solvent, and the upper limit on the content of solid of the prepared positive electrode slurry.

In addition, when a positive electrode is manufactured through a positive electrode slurry using a solvent, the positive electrode slurry applied on a current collector needs to be dried to remove the solvent. During the process, the thickness of the positive electrode active material is reduced so that there is a problem in that it is difficult to manufacture a positive electrode active material layer having a uniform thickness.

Therefore, there is a demand for a method for manufacturing a positive electrode, the method capable of increasing the content of a conductive material in the positive electrode, not being affected by a solid content, and minimizing a thickness deviation of the manufactured positive electrode.

PRIOR ART DOCUMENT

Patent Document

Japanese Patent Laid-Open Publication No. 2015-220225

DISCLOSURE OF THE INVENTION

Technical Problem

An aspect of the present invention provides a method for manufacturing a positive electrode, the method capable of increasing the content of a conductive material in the positive electrode, not being affected by a solid content, and minimizing a thickness deviation of the manufactured positive electrode.

Technical Solution

According to an aspect of the present invention, there is provided a method for manufacturing a positive electrode, the method including preparing a mixture by dry mixing a positive electrode active material, a dry conductive material, and a dry binder, applying high shear force to the mixture, disposing the mixture on a current collector, and rolling the current collector on which the mixture is disposed, wherein the dry conductive material is at least one of a carbon nanotube and a carbon fiber, and the high shear force is 50 N to 1000 N.

According to another aspect of the present invention, there is provided a positive electrode having a thickness deviation of 5 μm or less and including a current collector, and a positive electrode active material layer disposed on the current collector, wherein the positive electrode active material layer includes a positive electrode active material, a dry conductive material, and a dry binder, and the dry conductive material is at least one of a carbon nanotube and a carbon fiber.

Advantageous Effects

A method for preparing a positive electrode according to an embodiment of the present invention manufactures a positive electrode through a dry method in which a solvent is not used, thereby being capable of increasing the content of a conductive material in the positive electrode, not requiring a manufacturing step of a positive electrode slurry, not being affected by a solid content of the positive electrode slurry. Accordingly, the process may be simplified and the resistance of the manufactured positive electrode may be minimized.

In addition, a positive electrode according to another embodiment of the present invention is manufactured by the manufacturing method, and thus, a positive electrode active material layer with minimized thickness deviation may be included therein. Accordingly, the capacity variation of a battery may be reduced, and the lifespan properties of the battery may be improved.

MODE FOR CARRYING OUT THE INVENTION

Hereinafter, the present invention will be described in more detail to facilitate understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

<Positive Electrode>

A positive electrode according to an embodiment of the present invention includes a current collector, and a positive electrode active material layer disposed on the current collector, wherein the positive electrode active material layer includes a positive electrode active material, a dry conductive material, and a dry binder, and the dry conductive material is at least one of a carbon nanotube and a carbon fiber. A thickness deviation of the positive electrode may be 5 μm, or less.

The current collector is not particularly limited as long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used. In addition, the positive electrode current collector may typically have a thickness of 3 μm to 500 μm, and microscopic irregularities may be formed on the surface of the current collector to improve the adhesion of the positive electrode active material. The current collector, for example, may be used in various shapes such as that of a film, a sheet, a foil, a net, a porous body, a foam body, a non-woven fabric body, and the like.

The positive electrode active material layer may be disposed on the current collector. Specifically, the positive electrode active material layer may be disposed on one side or both sides of the current collector.

The dry conductive material may impart conductivity to the positive electrode. Here, the dry conductive material refers to a conductive material in the form of powder and the like, in which a solvent is not used.

The dry conductive material may include at least one of a carbon nanotube and a carbon fiber, specifically, at least one of a carbon nanotube and a carbon fiber. The lengths of the carbon nanotube and the carbon fiber are larger than that of a conductive material which is typically spherical or plate-shaped. In the carbon nanotube and the carbon fiber, the longest length may be referred to as the greatest distance between two points in a carbon nanotube or a carbon fiber. Since the length of the carbon nanotube and the carbon fiber is greater than that of a typical conductive material, a conductive network may be formed in the positive electrode active material layer, so that the resistance of the positive electrode may be reduced. Furthermore, the carbon nanotube and the carbon fiber may be combined with the positive electrode active material, so that the volume of the positive electrode active material may be controlled so as not to be excessively changed during charging/discharging of a secondary battery. Thus, the lifespan and stability of the secondary battery may be improved.

The carbon nanotube may be a bundle-type carbon nanotube. The bundle-type carbon nanotube may include a plurality of carbon nanotube unit bodies. Specifically, here, "a bundle type" refers to, unless otherwise stated, a secondary shape in the form of a bundle or a rope in which a plurality of carbon nanotube unit bodies are aggregated (wherein the axes in the longitudinal direction of the carbon nanotube unit bodies are arranged to be parallel in substantially the same orientation, or entwined). The carbon nanotube unit body is a graphite sheet having a shape of a cylinder of a nano-sized diameter, and has n $sp^2$ bonding structure. At this time, depending on the angle and structure in which the graphite surface is rolled, the properties of a conductor or a semi-conductor may be exhibited. The carbon nanotube unit body may be categorized into a single-walled carbon nanotube (SWCNT) unit body, a double-walled carbon nanotube (DWCNT) unit body, and a multi-walled carbon nanotube (MWCNT) depending on the number of bonds forming a wall. Specifically, the carbon nanotube unit body may be a multi-walled carbon nanotube unit body. When compared with a single-walled carbon nanotube unit body and a double-walled carbon nanotube unit body, the carbon nanotube unit body is preferable in that less energy is required for dispersion and dispersion conditions are easily controllable.

The average length of the carbon nanotubes may be 1 μm to 100 μm, specifically, 5 μm to 50 μm. When the above range of length is satisfied, the conductivity of an electrode is excellent and the flexibility of the electrode is improved, so that the mechanical stability thereof may be improved.

The average diameter of the carbon nanotube unit bodies may be 5 nm to 100 nm specifically, 10 nm to 50 nm. When the above range of diameter is satisfied, the conductive material in an electrode may be smoothly dispersed, so that the conductivity of the electrode may be improved. The diameter refers to the average diameter of cross sections when the carbon nanotube unit bodies are cut in the short axis direction between the long axis direction and the short axis direction of the carbon nanotube unit body.

The average length of the carbon fibers may be 1 μm to 50 μm, specifically, 2 μm to 10 μm. When the above range of length is satisfied, the conductivity of an electrode is excellent and the flexibility of the electrode is improved, so that the mechanical stability thereof may be improved.

The average diameter of the carbon fibers may be 5 nm to 500 nm, specifically, 50 nm to 300 nm. When the above range of diameter is satisfied, the conductive material in an electrode may be smoothly dispersed, so that the conductivity of the electrode may be improved. The diameter refers to the average diameter of cross sections shown when the carbon fibers are cut in the short axis direction between the long axis direction and the short axis direction of the carbon fiber.

The dry conductive material may be present in an amount of 1 wt % to 10 wt %, specifically 2 wt % to 4 wt % based on the total weight of the positive electrode active material layer. When the above range is satisfied, the conductivity of an electrode is excellent and the flexibility of the electrode may be improved.

The positive electrode active material may be a positive electrode active material commonly used in the art. Specifically, the positive electrode active material may be at least any one selected from the group consisting of a layered compound such as lithium cobalt oxide ($LiCoO_2$) and lithium nickel oxide ($LiNiO_2$), or a compound substituted with one or more transition metals; a lithium iron oxide such as $LiFe_3O_4$; a lithium manganese oxide such as $Li_{1+a1}Mn_{2-a1}O_4$ ($0 \leq a1 \leq 0.33$), $LiMnO_3$, $LiMn_2O_3$, and $LiMnO_2$; lithium copper oxide ($Li_2CuO_2$); a vanadium oxide such as $LiV_3O_8$, $V_2O_5$, and $Cu_2V_2O_7$; a Ni-site type lithium nickel oxide represented by $LiNi_{1-a2}M_{a2}O_2$ (wherein M is at least any one selected from the group consisting of Co, Mn, Al, Cu, Fe, Mg, B or Ga, and $0.01 \leq a2 \leq 0.3$) including formulas such as $Li[Ni_{0.6}Mn_{0.2}Co_{0.2}]O_2$ and $Li[Ni_{0.5}Mn_{0.3}Co_{0.2}]O_2$; a lithium manganese composite oxide represented by the formula $LiMn_{2-a3}M_{a3}O_2$ (wherein, M is at least any one selected from the group consisting of Co, Ni, Fe, Cr, Zn, or Ta, and $0.01 \leq a3 \leq 0.1$), or by the formula $Li_2Mn_3MO_8$ (wherein, M is at least any one selected from the group consisting of Fe, Co, Ni, Cu, or Zn); $LiMn_2O_4$ having a part of Li in the formula substituted with an alkaline earth metal ion, or the like. More specifically, the positive electrode active material may be at least any one of $Li[Ni_{0.6}Mn_{0.2}Co_{0.2}]O_2$ and $Li[Ni_{0.5}Mn_{0.3}Co_{0.2}]O_2$.

The dry binder serves to improve the bonding between positive electrode active materials and the adhesion between the positive electrode active material and the current collector. Here, the dry binder refers to a binder in the form of powder and the like, in which a solvent is not used.

The dry binder may be at least one selected from the group consisting of polyvinylidene fluoride (PVDF), a polyvinylidene fluoride-hexafluoropropylene copolymer (PVDF-HFP), polyvinyl alcohol, polyacrylonitrile, carboxymethyl cellulose (CMC), starch, hydroxypropyl cellulose, regenerated cellulose, polyvinylpyrrolidone, tetrafluoroethylene (PTFE), polyethylene, polypropylene, an ethylene-propylene-diene monomer (EPDM), a sulfonated EPDM, styrene-butadiene rubber (SBR), fluorine rubber, or various copolymers thereof. Furthermore, in order to further improve the adhesion of the positive electrode by applying high shear force such that agglomeration is smoothly obtained together with the positive electrode active material and the dry conductive material, the dry binder may be at least any-one of polyvinylidene fluoride-hexafluoropropylene and polytetrafluoroethylene. The dry binder may be included in an amount of 2 wt % to 10 wt % based on the total weight of the positive electrode active material layer.

The thickness deviation of the positive electrode may be 5 μm or less, specifically 0.001 μm to 5 μm, and more specifically, 0.01 μm to 4 μm. When the thickness deviation is greater than 5 μm, when manufacturing an electrode, problems such as the flatness of a cell is deteriorated or the amount of application is un-uniform may occur. The thickness deviation may be measured in the following manner. A force of 0.5 N to 1.0 N may be applied on a portion of a positive electrode and the other portions using a 5 mm tip to measure the thickness thereof, and the thickness deviation may be measured as an average of the difference between the thickness of the portion and the thickness of the other portions. According to the present invention, a positive electrode is manufactured by a dry method in which a solvent is not used, and thus, a problem in which the thickness deviation of the positive electrode is increased may be solved. Therefore, the thickness deviation of the positive electrode is derived by a manufacturing method which is one of the technical features of the present invention.

The electrode adhesion of the positive electrode active material layer may be 35 gf/20 mm to 200 gf/20 mm, specifically, 50 gf/20 mm to 150 gf/20 mm. In the present invention, a positive electrode does not use a solvent, and a positive electrode active material, a dry conductive material, and a dry binder are disposed on a current collector and then rolled, so that the electrode adhesion may satisfy the above range. The electrode adhesion may be measured in the following manner. The positive electrode is pressed to 20 mm×150 mm and then fixed on a center portion of a slide glass of 25 mm×75 mm using a tape. While removing a current collector using UTM, 90 degree peel strength may be measured to measure the electrode adhesion.

According to another embodiment of the present invention, there is provided an electrochemical device including the positive electrode. The electrochemical device may specifically be a battery or a capacitor, more specifically, a secondary battery.

The secondary battery specifically includes a positive electrode, a negative electrode disposed facing the positive electrode, a separator disposed between the positive electrode and the negative electrode, and an electrolyte. The positive electrode is as described above. Also, the secondary battery may further selectively include a battery case accommodating an electrode assembly of the positive electrode, the negative electrode, and the separator, and a sealing member for sealing the battery case.

In the secondary battery, the negative electrode includes a negative electrode current collector and a negative electrode active material layer disposed on the negative electrode current collector.

The negative electrode current collector is not particularly limited as long as it has high conductivity without causing a chemical change in the battery. For example, copper, stainless steel, aluminum, nickel, titanium, fired carbon, copper or stainless steel that is surface-treated with one of carbon, nickel, titanium, silver, and the like, and an aluminum-cadmium alloy may be used. Also, the negative electrode collector may typically have a thickness of 3 μm to 500 μm, and as in the case of the positive electrode current collector, microscopic irregularities may be prepared on the surface of the negative electrode current collector to improve the adhesion of a negative electrode active material. The negative electrode current collector may be used in various forms of such as a film, a sheet, a foil, a net, a porous body, a foam body, and a non-woven fabric body.

The negative electrode active material layer selectively includes a binder and a conductive material in addition to the negative electrode active material. The negative electrode active material layer may be prepared by, for example, applying the negative electrode active material and, a composition for preparing a negative electrode active material layer selectively including a binder and a conductive material on the negative electrode current collector, and then drying. Alternatively, the negative electrode active material layer may be prepared by casting the composition for forming a negative electrode on a separate support and then laminating a film separated from the support on the negative electrode current collector.

As the negative electrode active material, a compound capable of reversibly intercalating and deintercalating lithium may be used. Specific examples may be a carbonaceous material such as artificial graphite, natural graphite, graphitized carbon fiber, and amorphous carbon; a metallic compound alloyable with lithium such as Si, Al, Sn, Pb, Zn, Bi, In, Mg, Ga, Cd, a Si alloy, a Sn alloy, or an Al alloy; a metal oxide which may be doped and undoped with lithium such as $SiO_x$ ($0<x<2$), $SnO_2$, a vanadium oxide, and a lithium vanadium oxide; or a composite including the metallic compound and the carbonaceous material such as a Si—C composite or a Sn—C composite, and any one thereof or a mixture of two or more thereof may be used. Also, as the negative electrode active material, a metallic lithium thin film may be used. In addition, as the carbon material, low crystalline carbon, high crystalline carbon, and the like may be used. Typical examples of low crystalline carbon are soft carbon and hard carbon, and typical examples of high crystalline carbon may be irregular, planar, flaky, spherical, or fibrous natural graphite or artificial graphite, Kish graphite, pyrolytic carbon, mesophase pitch-based carbon fibers, meso-carbon microbeads, mesophase pitches, and high-temperature fired carbon such as petroleum or coal tar pitch derived cokes.

Also, the binder and the conductive material may be the same as those previously described in the description of the positive electrode.

Meanwhile, in the lithium secondary battery, the separator separates the negative electrode and the positive electrode, and provides a movement path for lithium ions. Any separator may be used without particular limitation as long as it is typically used as a separator in a lithium secondary battery. Particularly, a separator having high moisture-retention ability for an electrolyte as well as low resistance to the movement of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure having two or more layers thereof may be used. Also, a typical porous non-woven fabric, for example, a non-woven fabric formed of high melting point glass fibers or polyethylene terephthalate fibers may be used. Furthermore, a coated separator including a ceramic component or a polymer material may be used to secure heat resistance or mechanical strength, and may be selectively used as a single layer or a multilayered structure.

Also, the electrolyte used in the present invention may be an organic liquid electrolyte, an inorganic liquid electrolyte, a solid polymer electrolyte, a gel-type polymer electrolyte, a solid inorganic electrolyte, or a molten-type inorganic electrolyte, which may be used in the preparing of a lithium secondary battery, but is not limited thereto.

Specifically, the electrolyte may include an organic solvent and a lithium salt.

As the organic solvent, any organic solvent may be used without particular limitation as long as it may serve as a medium through which ions involved in an electrochemical reaction of the battery may move. Specifically, an ester-based solvent such as methyl acetate, ethyl acetate, γ-butyrolactone, and ε-caprolactone; an ether-based solvent such as dibutyl ether or tetrahydrofuran; a ketone-based solvent such as cyclohexanone; an aromatic hydrocarbon-based solvent such as benzene and fluorobenzene; a carbonate-based solvent such as dimethyl carbonate (DMC), diethyl carbonate (DEC), methylethyl carbonate (MEC), ethylmethyl carbonate (EMC), ethylene carbonate (EC), and propylene carbonate (PC); an alcohol-based solvent such as ethyl alcohol and isopropyl alcohol; nitriles such as R—CN (where R is a linear, branched, or cyclic C2 to C20 hydrocarbon group and may include a double-bond aromatic ring or ether bond); amides such as dimethylformamide; dioxolanes such as 1,3-dioxolane; or sulfolanes may be used as the organic solvent. Among these solvents, a carbonate-based solvent is preferable, and a mixture of a cyclic carbonate (e.g., ethylene carbonate or propylene carbonate) having high ionic conductivity and high dielectric constant, which may increase charge/discharge performance of the battery, and a low-viscosity linear carbonate-based compound (e.g., ethylmethyl carbonate, dimethyl carbonate, or diethyl carbonate) is more preferable. In this case, when a cyclic carbonate and a chain carbonate are mixed in a volume ratio of about 1:1 to about 1:9, the performance of the electrolyte may be excellent.

As the lithium salt, any compound may be used without particular limitation as long as it may provide lithium ions used in a lithium secondary battery. Specifically, $LiPF_6$, $LiClO_4$, $LiAsF_6$, $LiBF_4$, $LiSbF_6$, $LiAlO_4$, $LiAlCl_4$, $LiCF_3SO_3$, $LiC_4FgSO_3$, $LiN(C_2F_5SO_3)$, $LiN(C_2F_5SO_2)_2$, $LiN(CF_3SO_2)_2$, LiCl, LiI, or $LiB(C_2O_4)_2$ may be used as the lithium salt. The lithium salt may be used in a concentration range of 0.1 M to 2.0 M. When the concentration of the lithium salt is included within the above range, the electrolyte has suitable conductivity and viscosity so that the electrolyte may show excellent performance, and lithium ions may effectively move.

In order to improve the lifespan properties of the battery, suppress the deterioration in battery capacity, and improve the discharge capacity of the battery, one or more additives, for example, a halo-alkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride may further be included in the electrolyte in addition to the above electrolyte components. At this time, the additive may be included in an amount of 0.1 wt % to 5 wt % based on the total weight of the electrolyte.

As described above, the secondary battery including the positive electrode active material according to the present invention stably exhibits excellent discharge capacity, output properties, and capacity retention, thereby being useful for portable devices such as a mobile phone, a notebook computer, and a digital camera, and for electric cars such as a hybrid electric vehicle (HEV).

Thus, according to another embodiment of the present invention, a battery module including the secondary battery as a unit cell, and a battery pack including the battery module are provided.

The battery module or the battery pack may be used as a power source of at least one medium and large sized device of a power tool; electric cars including an electric vehicle (EV), a hybrid electric vehicle (HEV), and a plug-in hybrid electric vehicle (PHEV); or a power storage system.

A method for manufacturing a positive electrode according to another embodiment of the present invention includes, preparing a mixture by dry mixing a positive electrode active material, a dry conductive material, and a dry binder; applying high shear force to the mixture; disposing the mixture on a current collector; and rolling the current collector on which the mixture is disposed, wherein the dry conductive material is at least one of a carbon nanotube and a carbon fiber, and the high shear force is 50 N to 1000 N. Here, the positive electrode active material, the dry conductive material, and the dry binder are the same as the positive electrode active material, the dry conductive material, and the dry binder described above, and therefore, the descriptions thereof will be omitted.

The mixture may be prepared by dry mixing the positive electrode active material, the dry conductive material, and the dry binder.

The dry mixing refers to mixing without a solvent. The solvent refers to a solvent typically used in the preparation of a positive electrode slurry, and may be, for example, water, N-methyl-2-pyrrolidone (NMP), and the like. Although not necessarily limited thereto, the dry mixing may be performed by mixing at 600 rpm to 1800 rpm for 40 minutes to 60 minutes at room temperature or below using an agitating machine.

The method for manufacturing a positive electrode of the present embodiment may include a step of applying high shear force to the mixture. The step of applying high shear force may be performed before disposing the mixture on the current collector. The step of applying high shear force may include shear-compressing the mixture to apply high shear force thereto. Specifically, when using a device for applying shear force, for example, Nobilta (Hosokawa Micron Corporation), it is possible to apply high shear force to the mixture by shear-compressing the same using a blade in the device. However, the present invention is not limited thereto. When applying high shear force to the mixture, the positive electrode active material, the dry binder, the dry conductive material (specifically, a carbon nanotube or a carbon fiber) in the mixture may be entangled with each other, such that granules in which the dry conductive material, the positive electrode active material, and the dry binder are aggregated may be formed. Accordingly, the positive active material and the dry binder are supported by the dry conductive materials by the presence of the granules, so that the adhesion among and the positive active material, the dry binder and the drying binder may be increased. Thus, a process of disposing the mixture on the current collector is facilitated, and the electrode adhesion of the manufactured positive electrode may be improved.

The high shear force may be 50 N to 1000 N, specifically 100 N to 500 N, more specifically 100 N to 300 N. The present invention applies high shear force in the above range in order to induce entanglement of the carbon nanotube, the carbon fiber, and the like.

The disposing of the mixture on the current collector may include disposing the mixture on the current collector in the following manner. Specifically, the mixture may be disposed in a uniform thickness on the current collector by a scattering method. More specifically, when using the scattering method, the mixture may be moved through a feeding roller, and when the mixture is applied on the current collector, the mixture may be applied in a predetermined amount using a brush.

The rolling of the current collector on which the mixture is disposed may include applying pressure to the current collector. At this time, the pressure may include compressive force. The pressure may be applied through a roll press method. A device for roll pressing may include a roll for applying pressure on the mixture and the current collector, and a belt for moving the current collector. While the current collector is being moved by a belt, the mixture and the current collector receives pressure from the roll. At this time, the pressure includes compressive force. Before the pressure is applied, the belt may be pre-heated to 50° C. to 100° C. so that heat may be transferred to the current collector on which the mixture is disposed. In addition, when the pressure is applied, the temperature of the roll may be 50° C. to 150° C.

Hereinafter, preferred embodiments of the present invention will be described in detail to facilitate understanding of the present invention. However, the embodiments are merely illustrative of the present invention, and thus, it will be apparent to those skilled in the art that various modifications and variations can be made without departing from the scope and spirit of the present invention as disclosed in the accompanying claims. It is obvious that such variations and modifications fall within the scope of the appended claims.

EXAMPLES AND COMPARATIVE EXAMPLES

Example 1: Manufacturing of Positive Electrode 96 g of $Li[Ni_{0.6}Mn_{0.2}Co_{0.2}]O_2$ as a positive electrode active material particle, 3 g of carbon nanotube (a bundle-type) having a unit body diameter of 10 nm and a length of 50 μm as a conductive material, and 1.5 g of PVDF-HFP and 1.5 g of PTFE as a binder were mixed without a solvent for 25 minutes at 1800 rpm using Nobilta (Hosokawa Micron Corporation). Next, shear force of 250 N was applied to the mixture using Nobilta (Hosokawa Micron Corporation). Thereafter, the mixture was disposed in a loading amount of 52 mg/cm$^2$ on one side of an aluminum current collector having a thickness of 15 μm using a scattering method to manufacture a preliminary electrode. The preliminary electrode was disposed on a belt of a roll press device and the belt was pre-heated to 60° C. Thereafter, the preliminary electrode was rolled using a roll of 60° C. to manufacture a positive electrode of Example 1.

Example 2: Manufacturing of Positive Electrode

A positive electrode of Example 2 was prepared in the same manner as in Example 1 except that 3 g of carbon fiber having a diameter of 150 nm and a length of 10 μm was used as a conductive material instead of the carbon nanotube in Example 1.

Example 3: Manufacturing of Positive Electrode

A positive electrode of Example 3 was prepared in the same manner as in Example 1 except that 3 g of carbon fiber having a diameter of 100 nm and a length of 5 μm was used as a conductive material instead of a carbon nanotube in Example 1.

Example 4: Manufacturing of Positive Electrode

A positive electrode of Example 4 was prepared in the same manner as in Example 1 except that a carbon nanotube having a length of 80 μm was used.

Comparative Example 1: Manufacturing of Positive Electrode 96 g of $Li[Ni_{0.6}Mn_{0.2}Co_{0.2}]O_2$ as a positive electrode active material particle, 3 g of carbon nanotube having a diameter of 10 nm and a length of 50 μm as a conductive material, and 1.5 g of PVDF-HFP and 1.5 g of PTFE as a binder were added to 1.5 g of NMP as a solvent and stirred to prepare a positive electrode slurry of 5 wt % of mixture solid. The positive electrode slurry was applied in a loading amount of 52 mg/cm² on one side of an aluminum current collector having a thickness of 350 μm, and then dried. At this time, the drying was performed in a convention oven at 60° C. Thereafter, the current collector on which the positive electrode slurry is applied and dried was rolled through a roll at room temperature, dried for 12 hours in a vacuum oven at 80° C. to manufacture a positive electrode of Comparative Example 1.

Comparative Example 2: Manufacturing of Positive Electrode

A positive electrode of Comparative Example 2 was prepared in the same manner as in Comparative Example 1 except that 3 g of carbon fiber having a diameter of 150 nm and a length of 10 μm was used as a conductive material instead of the carbon nanotube in Comparative Example 1.

Comparative Example 3: Manufacturing of Positive Electrode

A positive electrode of Comparative Example 3 was prepared in the same manner as in Comparative Example 1 except that shear force of 1200 N, not 250 N, was applied.

Comparative Example 4: Manufacturing of Positive Electrode

A positive electrode of Comparative Example 4 was prepared in the same manner as in Comparative Example 1 except that shear force of 25 N, not 250 N, was applied.

Experimental Example 1: Evaluation of Electrode Adhesion of Positive Electrode

Each of the positive electrode of Examples 1 to 4 and Comparative Examples 1 to 4 was pressed to 20 mm×150 mm and then fixed on a center portion of a slide glass of 25 mm×75 mm using a tape. While removing the current collector using UTM, 90 degree peel strength was measured.

The evaluation was performed by measuring the peel strength of five or more and calculating an average value. The results are shown in Table 1 below.

Experimental Example 2: Evaluation of Thickness Deviation of Positive Electrode

A portion of each of the positive electrode of Examples 1 to 4 and Comparative Examples 1 to 4, and the other portions thereof separated from the one portion at intervals of 10 mm were applied with a force of 1.0 N using a 5 mm tip to measure the thickness thereof (thickness measurement standard: 100 mm). The thickness deviation was measured as an average of the difference between the thickness of the portion and the thickness of the other portions.

TABLE 1

|  | Adhesion of positive electrode (gf/20 mm) | Thickness deviation of positive electrode (μm) |
| --- | --- | --- |
| Example 1 | 65 | 4 |
| Example 2 | 84 | 3 |
| Example 3 | 115 | 2 |

TABLE 1-continued

|  | Adhesion of positive electrode (gf/20 mm) | Thickness deviation of positive electrode (μm) |
| --- | --- | --- |
| Example 4 | 56 | 5 |
| Comparative Example 1 | 15 | 7 |
| Comparative Example 2 | 23 | 6 |
| Comparative Example 3 | 21 | 6 |
| Comparative Example 4 | 17 | 6.5 |

In the cases of Examples 1 to 4, it was confirmed that the thickness of the positive electrode was small and the adhesion of the positive electrode was high compared with Comparative Examples 1 to 4 since the positive electrode was manufactured through the drying method.

Examples 5 to 8 and Comparative Examples 5 to 8: Manufacturing of Secondary Battery Using the positive electrode manufactured in Examples 1 to 4 and Comparative Examples 1 to 4, each of the batteries of Examples 5 to 8 and Comparative Examples 5 to 8 were manufactured. The specific manufacturing method is as follows (1) Manufacturing of Negative Electrode Natural graphite as a negative electrode active material, carbon black as a conductive material, and PVdF as a binder were mixed in N-methylpyrrolidone as a solvent in a weight ratio of 85:10:5 to prepare a composition for forming a negative electrode, and the composition was applied on a copper current collector to manufacture a negative electrode.

(2) Manufacturing of Battery

By disposing a porous polyethylene separator between the positive electrode and the negative electrode manufactured in Examples 1 to 4 and Comparative Example 1 to 4, an electrode assembly was manufactured. Then, the electrode assembly was placed inside a case, and an electrolyte was injected into the case to manufacture a lithium secondary battery. At this time, the electrolyte was prepared by dissolving lithium hexafluorophosphate ($LiPF_6$) of 1.0 M concentration in an organic solvent of ethylene carbonate/dimethyl carbonate/ethylmethyl carbonate (mixing volume ratio of EC/DMC/EMC=3/4/3). As such, the secondary battery of Examples 5 to 8 and Comparative Examples 5 to 8 was prepared.

Experimental Example 3: Evaluation of Capacity Retention

For each of the secondary batteries of Examples 5 to 8 and Comparative Examples 5 to 8, capacity retention was evaluated by performing charging/discharging and the results are shown in Table 2. The first and the second cycle were performed by charging/discharging at 0.1 C, and from the third cycle to the $49^{th}$ cycle, charging/discharging were performed at 0.5 C. The $50^{th}$ cycle was terminated in the state of charging (state in which lithium was in the negative electrode).

Charging condition: CC (constant current)/CV (constant voltage) (5 mV/0.005 C current cut-off)

Discharging condition: CC (constant current) Condition 1.5 V

Capacity retention was derived by the following calculation, respectively.

Capacity retention (%)=(discharge capacity of 49 times/discharge capacity of 1 time)×100

TABLE 2

| | Capacity retention (%) |
|---|---|
| Example 5 | 80 |
| Example 6 | 82 |
| Example 7 | 81 |
| Example 8 | 77 |
| Comparative Example 5 | 70 |
| Comparative Example 6 | 73 |
| Comparative Example 7 | 75 |
| Comparative Example 8 | 73 |

In the cases of Examples 5 to 8, it was confirmed that the capacity retention was improved compared with Comparative Examples 5 to 8 since the capacity unevenness of the battery was solved by using the positive electrode having a small thickness deviation.

The invention claimed is:

1. A positive electrode, comprising:
a current collector; and
a positive electrode active material layer disposed on the current collector, wherein the positive electrode active material layer comprises a positive electrode active material, a dry conductive material, and a dry binder, the positive electrode active material, the dry conductive material, and the dry binder have been subjected to a high shear force to form granules,
the dry conductive material comprises at least one of a carbon nanotube and a carbon fiber,
wherein the carbon nanotube has an average length from 5 μm to 80 μm,
wherein the carbon fiber has an average length from 5 μm to 10 μm,
the high shear force is 100 N to 500 N, and the positive electrode has a thickness deviation of 5 m or less.

2. The positive electrode of claim 1, wherein the electrode adhesion of the positive electrode active material layer is 35 gf/20 mm to 200 gf/20 mm.

3. The positive electrode of claim 1, wherein the dry conductive material is present in an amount of 1 wt % to 10 wt % based on a total weight of the positive electrode active material layer.

4. A secondary battery comprising:
the positive electrode of claim 1;
a negative electrode;
a separator disposed between the positive electrode and the negative electrode; and
an electrolyte.

5. The positive electrode of claim 1, wherein the dry conductive material is in a form of a powder in which solvent is not present, and the dry binder is in a form of a powder in which solvent is not present.

6. A method for manufacturing a positive electrode, comprising:
preparing a mixture by dry mixing a positive electrode active material, a dry conductive material, and a dry binder;
applying high shear force to the mixture, wherein the positive electrode active material, the dry conductive material, and the dry binder are aggregated to form granules;
disposing the mixture on a current collector; and
rolling the current collector on which the mixture is disposed,
wherein
the dry conductive material is at least one of a carbon nanotube and a carbon fiber,
wherein the carbon nanotube has an average length from 5 μm to 80 μm,
wherein the carbon fiber has an average length from 5 μm to 10 μm, and
the high shear force is 100 N to 500 N.

7. The method of claim 6, wherein the dry conductive material is carbon nanotube, which is a bundle shape carbon nanotube in which a plurality of carbon nanotube unit bodies are aggregated, and average diameters of the carbon nanotube unit bodies are 5 nm to 100 nm.

8. The method of claim 6, wherein the dry conductive material is carbon fiber, and an average diameter of the carbon fiber is 5 nm to 500 nm.

9. The method of claim 6, wherein the applying of high shear force to the mixture comprises shear-compressing the mixture to apply high shear force thereto.

10. The method of claim 6, wherein the disposing of the mixture comprises disposing the mixture in a uniform thickness on the current collector by a scattering method.

11. The method of claim 6, wherein the rolling of the current collector on which the mixture is disposed comprises placing the current collector on which the mixture is disposed on a belt, and rolling the current collector on which the mixture is disposed through a roll.

12. The method of claim 11, wherein the placing of the current collector on which the mixture is disposed on a belt comprises pre-heating the belt to 50° C. to 100° C.

13. The method of claim 11, wherein a temperature of the roll is 50° C. to 150° C. in the rolling of the current collector on which the mixture is disposed through a roll.

14. The method of claim 6, wherein the dry binder is at least one of polyvinylidene fluoride-hexafluoropropylene and polytetrafluoroethylene.

15. The method of claim 6, wherein the dry conductive material is in a form of a powder in which solvent is not present, and the dry binder is in a form of a powder in which solvent is not present.

* * * * *